United States Patent [19]
Anderson

[11] 3,953,239
[45] Apr. 27, 1976

[54] Al-AgO PRIMARY BATTERY
[75] Inventor: George E. Anderson, Middletown, R.I.
[73] Assignee: The United States of America as represented by the Secretary of the Navy, Washington, D.C.
[22] Filed: Jan. 27, 1975
[21] Appl. No.: 544,591

[52] U.S. Cl. .............................. 136/100 R; 136/161; 136/114
[51] Int. Cl.² ....................................... H01M 45/02
[58] Field of Search .............. 136/100 R, 161, 182, 136/154, 20, 83 R, 112–114, 162

[56] References Cited
UNITED STATES PATENTS

| | | | |
|---|---|---|---|
| 2,700,064 | 1/1955 | Akerman | 136/161 |
| 3,110,633 | 11/1963 | Bachmann | 136/161 |
| 3,113,891 | 12/1963 | Comanor et al. | 136/154 |
| 3,317,350 | 5/1967 | Murphy | 136/100 R |
| 3,378,408 | 4/1968 | Hamlen et al. | 136/100 R |

Primary Examiner—Anthony Skapars
Attorney, Agent, or Firm—Richard S. Sciascia; Arthur A. McGill; Prithvi C. Lall

[57] ABSTRACT

A primary battery comprising aluminum and silver oxide utilizes a pre-heated potassium hydroxide electrolyte for the generation of power. The battery with its electrolyte preheated to a minimum of 120° F is capable of providing a very high electrical energy source of minimum weight and volume for underwater propulsion systems. The electrolyte may be brought up to temperature by either conventional heating apparatus or a unique mixing procedure for providing an instantaneous temperature use.

3 Claims, 4 Drawing Figures

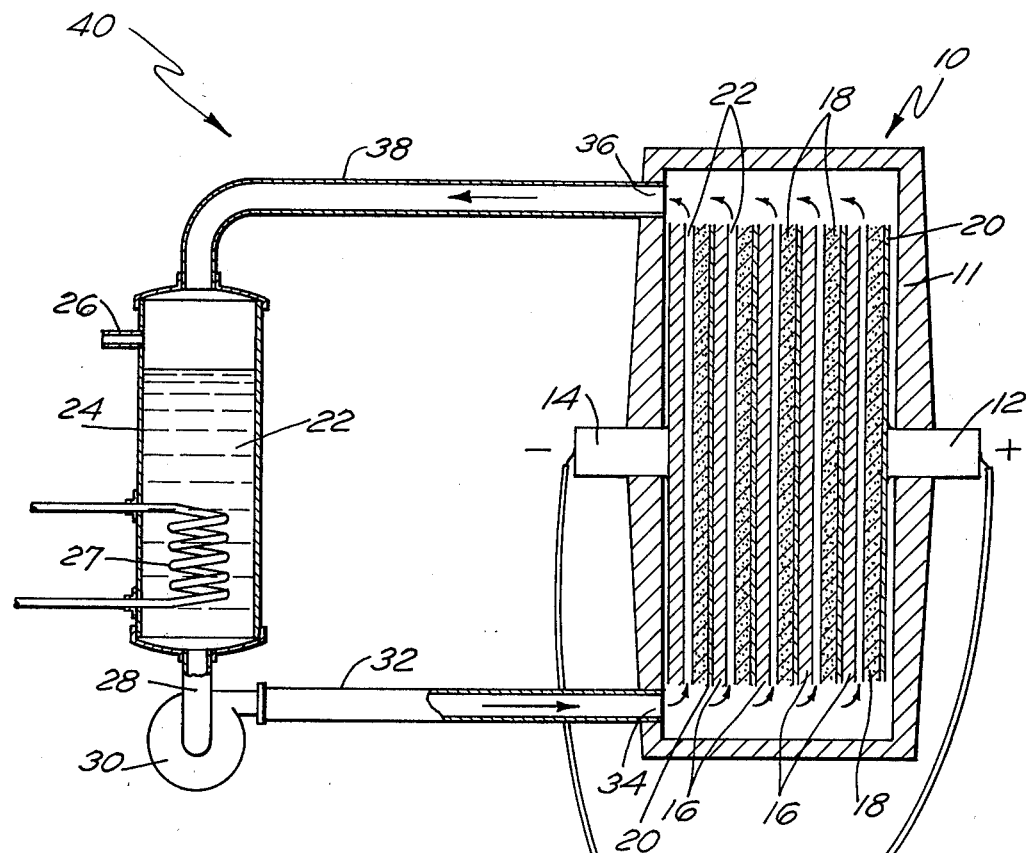
FIG. 1
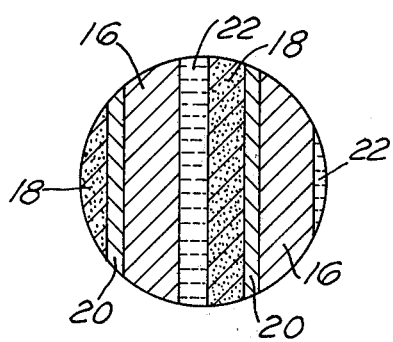
FIG. 2
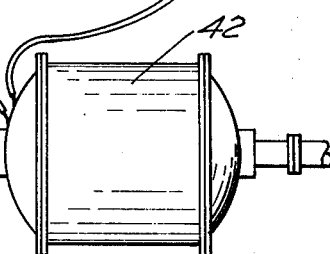

Al-AgO PRIMARY BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to a battery system and more particularly to a primary battery system for providing a quiet high energy source for a limited period of time for use in underwater propulsion systems.

Present batteries used for limited periods of time in underwater propulsion systems have specific capabilities. Some examples of electric propulsion units are the Magnesium-Silver Chloride Seawater Battery which develops approximately 40 watt-hours per pound and the Zinc-Silver Oxide Pile Battery which develops approximately 50 watt-hours per pound. Thermal propulsion systems have been developed that provide up to 80 watt-hours per pound of fuel and therefore have an advantage in speed and/or range capability. However, the electric propulsion system exhibit quieter operation, a most desirable characteristic for Naval Underwater Weapons Systems.

SUMMARY OF THE INVENTION

Accordingly, it is a general purpose and object of the present invention to provide an improved energy source. It is a further object that the source have a high energy density capability. An additional object is that the source be able to supply energy to a propulsion system for improved speed and/or range capability. Other objects are that the energy source be quiet, economical and low in weight and size. These and additional objects of the invention and the various features and details of construction and operation will become apparent from the specification and drawing.

This is accomplished in accordance with the present invention by providing an electrical energy source with an energy density capability exceeding that of noisier thermal units.

The source is comprised of a high performance primary battery having Aluminum Alloy and Divalent Silver Oxide electrodes with a preheated aqueous potassium hydroxide solution electrolyte. The output of the battery is connected to a propulsion motor for providing to the motor a high energy yield for a predetermined period of time. The primary battery may be part of a loop that includes piping, heating and pumping units.

BRIEF DESCRIPTION OF THE DRAWING

FIG. 1 is a partially cutaway view of a primary battery and other components of the energy system in the present invention;

FIG. 2 is an enlarged cross sectional view showing various components in the primary battery of FIG. 1.

DESCRIPTION OF THE PREFERRED EMBODIMENT

Figure 3:
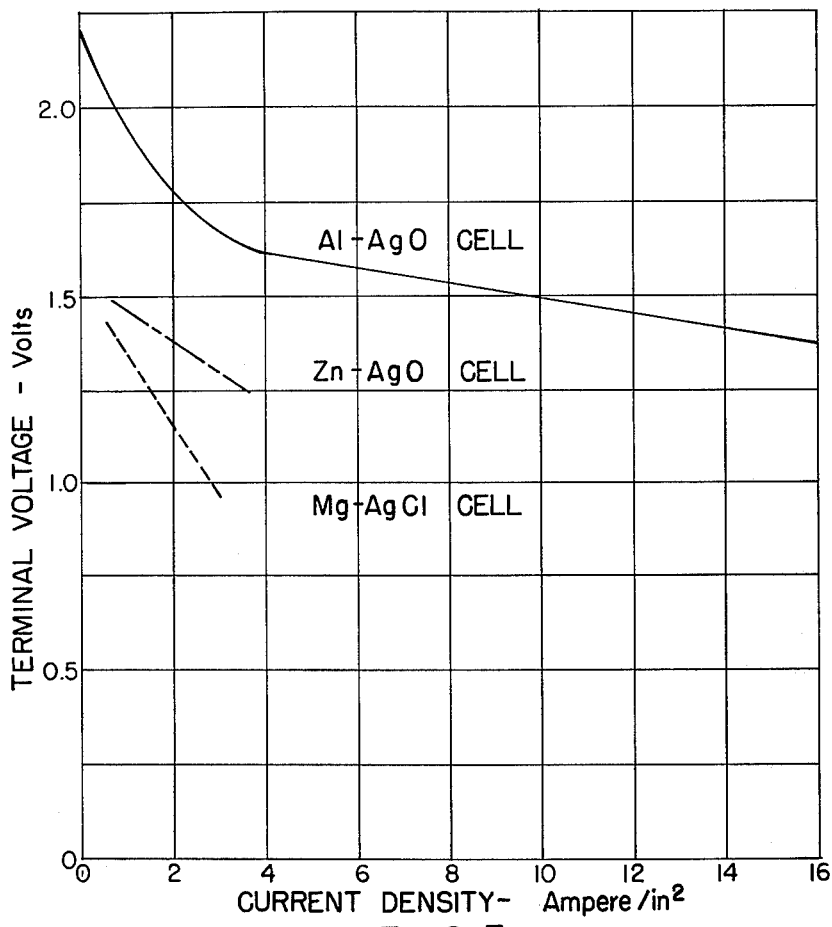
FIGS. 3 and 4 show performance curves comparing the primary battery of FIG. 1 with prior art batteries.

Referring now to FIGS. 1 and 2 there is shown a primary battery 10 including battery case 11 having respective positive and negative terminals 12 and 14. Battery case 11 encloses a plurality of both aluminum anode plates 16 and silver oxide cathode plates 18. Disposed between each pair of electrodes 16 and 18 is a potassium hydroxide electrolyte 22 of a predetermined temperature, to be explained later. Disposed between successive pairs of electrodes 16 and 18 is a silver foil intercell connection 20. The potassium hydroxide electrolyte 22 is shown flowing upward between electrodes or plates 16 and 18, but dependent upon design could be made to flow in the reverse direction.

An electrolyte reservoir 24 which may be a simple tank of various sizes and shapes has a vent 26 near its top. Heat exchanger coils 27 pass through the walls of reservoir 24 to control the temperature of the electrolyte 22. A piece of piping 28 connects reservoir 24 to a circulating pump 30 which controls the flow of the electrolyte 22 in the direction indicated. A piece of piping 32 connects pump 30 to inlet port 34 of battery 10. An outlet port 36 is connected to reservoir 24 by means of pipe 38 to complete a loop generally shown as 40 for the circulation of electrolyte 22.

A propulsion motor load 42 is connected to respective terminals 12 and 14 to receive the output generated by the battery 10.

FIG. 3 illustrates test data depicting the comparatively high terminal voltages obtained at extraordinary current densities for an aqueous electrolyte type battery. The present invention is capable of operating at current densities beyond 16 amperes per square inch to yield higher power.

Figure 4:
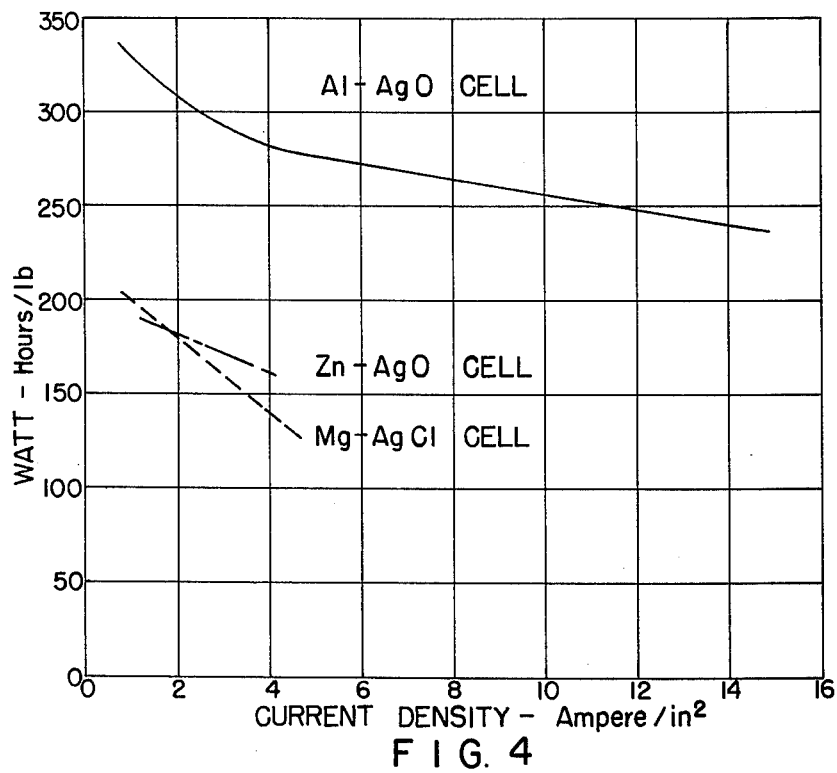

FIG. 4 illustrates the theoretical energy density of the inventive battery in watt-hours per pound of consumable electrode material based upon 100 per cent current efficiency as compared to that of the Zn-AgO and Mg-AgCl batteries on the same basis. This analysis shows that it appears feasible to operate an Al-AgO propulsion battery at more than twice the energy density of present batteries, i.e., over 100 watt-hours per pound of total battery weight. It is assumed the following overall process occurs upon discharge.

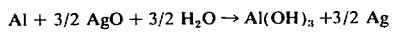

$$Al + 3/2\ AgO + 3/2\ H_2O \rightarrow Al(OH)_3 + 3/2\ Ag$$

Some gas evolution occurs, presumed to be hydrogen gas resulting from some chemical decomposition of the aluminum anode material. The aluminum hydroxide product at the anode is relatively soluble in the electrolyte solution, and it dissipates readily from the anode. The silver product at the cathode remains with the porous cathode to be recovered or recharged. Successful operation of this battery is attributed directly to its electrolyte being operated in the temperature range of 120° to 180° F and unrestricted access to the electrolyte by using spacers rather than a separator between electrodes. The aqueous potassium hydroxide solution used in the tests of FIGS. 3 and 4 was 30 per cent concentration. The water used in the solution may be distilled, tap or seawater. Concentrations varying from 10 to 50 per cent may be used.

In addition to the potassium hydroxide other electrolytes operable in a similar temperature range and of similar concentrations with the disclosed battery are sodium hydroxide and lithium hydroxide.

There has therefore been described an improved primary battery suitable for use in propulsion systems. In addition to the system in which the battery is disclosed, it is feasible to operate the battery in one in which the electrolyte is nonflowing with good results. An additional way of providing electrolyte to the battery is to store anhydrous potassium hydroxide in the battery system and activate the battery with the introduction of water or seawater. The heat of solution of potassium hydroxide is sufficient to raise the temperature of the electrolyte for proper operation within reasonable limits.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A primary battery system comprising:

a loop comprising a reservoir including a heat exchanger, a pump and a battery connected serially by means of piping; and a motor electrically connected to said battery, said battery including a battery housing having inlet and outlet ports for receiving said piping, a plurality of aluminum anode plates enclosed in said housing, a plurality of silver oxide cathode plates enclosed in said housing with each of said cathode plates paired with a respective anode plate, a plurality of intercell connectors respectively disposed between and touching successive pairs of said cathode and anode plates, and an electrolyte disposed between and touching each of said pairs of said cathode and anode plates, said electrolyte comprises an aqueous solution of 10 to 50 per cent concentrate selected from the group of potassium hydroxide, sodium hydroxide and lithium hydroxide, said electrolyte is pre-heated to a temperature between 120° and 180° F.

2. A primary battery system according to claim 1 wherein said electrolyte comprises potassium hydroxide.

3. A primary battery system according to claim 2 wherein said intercell connectors comprise silver foils.

* * * * *